US008957854B2

(12) United States Patent  
Coe

(10) Patent No.: US 8,957,854 B2  
(45) Date of Patent: Feb. 17, 2015

(54) ZERO-CLICK ACTIVATION OF AN APPLICATION

(75) Inventor: Brian Coe, Scotts Valley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/447,856

(22) Filed: Apr. 16, 2012

(65) Prior Publication Data

US 2012/0194431 A1    Aug. 2, 2012

Related U.S. Application Data

(63) Continuation of application No. 11/535,588, filed on Sep. 27, 2006, now Pat. No. 8,159,457.

(51) Int. Cl.
| | |
|---|---|
| *G09G 5/08* | (2006.01) |
| *G06F 3/038* | (2013.01) |
| *G06F 3/01* | (2006.01) |
| *G06F 3/0488* | (2013.01) |

(52) U.S. Cl.  
CPC ............... *G06F 3/038* (2013.01); *G06F 3/017* (2013.01); *G06F 3/04883* (2013.01)  
USPC .......................................... 345/157; 345/163

(58) Field of Classification Search  
CPC ....... G06F 3/017; G06F 3/033; G06F 3/0354; G06F 3/0383  
USPC ..................... 345/156–169; 715/863  
See application file for complete search history.

(56) References Cited

U.S. PATENT DOCUMENTS

| | | | | |
|---|---|---|---|---|
| 5,598,187 | A * | 1/1997 | Ide et al. ........................ | 345/156 |
| 6,573,883 | B1 * | 6/2003 | Bartlett ......................... | 345/158 |
| 2004/0125073 | A1 * | 7/2004 | Potter et al. .................... | 345/156 |
| 2005/0212766 | A1 * | 9/2005 | Reinhardt et al. ............. | 345/157 |
| 2006/0164382 | A1 * | 7/2006 | Kulas et al. .................... | 345/156 |
| 2007/0002018 | A1 * | 1/2007 | Mori .............................. | 345/158 |

\* cited by examiner

*Primary Examiner* — Regina Liang  
(74) *Attorney, Agent, or Firm* — James J. DeCarlo; Greenberg Traurig, LLP

(57) ABSTRACT

A method is described for activating an application without specific positioning of a mouse or clicking a mouse button ("zero-click activation"). This is done by evaluating motion of an input device with regard to predetermined criteria; detecting a rapid, multi-directional motion (a shaking motion) of the input device, and initiating a preconfigured application in response thereto. In an embodiment, the input device is a mouse, and the method is performed without actuating a button on the mouse. The preconfigured application may be a search function, and in particular may be a Web search invoked when a shaking action is detected while the user is viewing a Web site.

20 Claims, 8 Drawing Sheets

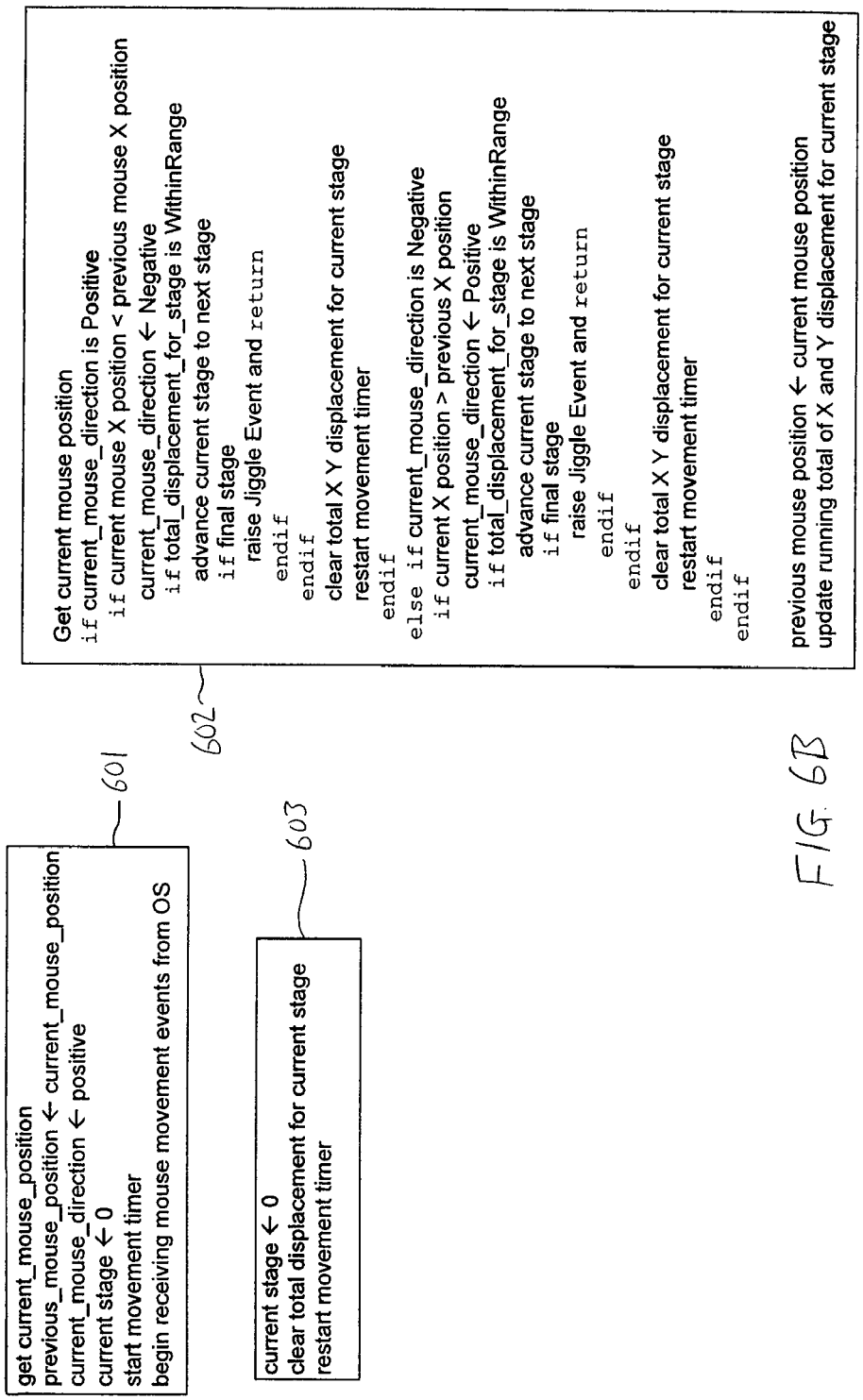

FIG. 6A

```
get current_mouse_position
previous_mouse_position ← current_mouse_position
current_mouse_direction ← positive
current stage ← 0
start movement timer
begin receiving mouse movement events from OS
```

FIG. 6B

```
Get current mouse position
if current_mouse_direction is Positive
    if current mouse X position < previous mouse X position
        current_mouse_direction ← Negative
        if total_displacement_for_stage is WithinRange
            advance current stage to next stage
            if final stage
                raise Jiggle Event and return
            endif
        endif
        clear total X Y displacement for current stage
        restart movement timer
    endif
else if current_mouse_direction is Negative
    if current X position > previous X position
        current_mouse_direction ← Positive
        if total_displacement_for_stage is WithinRange
            advance current stage to next stage
            if final stage
                raise Jiggle Event and return
            endif
        endif
        clear total X Y displacement for current stage
        restart movement timer
    endif
endif
previous mouse position ← current mouse position
update running total of X and Y displacement for current stage
```

FIG. 6C

```
current stage ← 0
clear total displacement for current stage
restart movement timer
```

ZERO-CLICK ACTIVATION OF AN APPLICATION

This application is a continuation of and claims the benefit of U.S. patent application Ser. No. 11/535,588, filed Sep. 27, 2006, issuing as U.S. Pat. No. 8,159,457, which is hereby incorporated by reference in its entirety.

FIELD OF THE DISCLOSURE

This disclosure relates to software applications on a personal computer or other computing device, and more particularly to activation of such applications using a directional pointing input device such as a mouse, trackball, stylus, etc.

BACKGROUND OF THE DISCLOSURE

A user of a personal computer often wishes to perform an action, such as a Web search, from the desktop shell, or from within an application such as a browser, email reader or word processor. This generally requires multiple mouse clicks, targeting the mouse over a specific user-interface (UI) widget, or entering a key-chord sequence using a keyboard.

For example, initiating a Web search from within a browser generally requires activating an edit control in a toolbar, clicking the mouse to navigate to a search engine or to activate a context menu, or pressing a memorized key sequence such as Alt-S. Initiating such a search from outside a browser also requires first activating the preferred search application, which involves other multiple mouse movements or keystrokes, such as clicking on the browser icon on the desktop.

Custom input devices and mouse gestures have been devised as an alternative to complicated click or keystroke sequences. An application action may be initiated when a detector application recognizes that the mouse has been moved in a predetermined manner. For example, drawing an "S" shape with the mouse could be configured to open the browser to a search engine site. This approach has a number of potential drawbacks: (1) It requires the user to manually activate the gesture recognizer, for if it runs all the time it can misinterpret normal mouse movement as a preconfigured gesture. (2) It requires the user to memorize the strokes of the various gesture commands as configured on a specific computer. (3) It requires the user to have sufficient dexterity and motor skills to articulate the gestures. Mouse gestures are therefore difficult for novice users or elderly users. Furthermore, typical mouse gestures often require a preactivation step performed with the mouse (e.g. holding down the right button before drawing the letter "S").

SUMMARY OF THE DISCLOSURE

The present disclosure describes a simple, effective procedure (and for software to support such a procedure) for initiating a selected application, that does not rely on preactivation or memorizing procedures or require a specific level of manual dexterity on the part of the user.

The present disclosure provides a method for activating a software application command or function without specific positioning of a mouse or clicking a mouse button ("zero-click activation"). This is done in at least one embodiment by evaluating motion of an input device with regard to predetermined criteria including at least one of distance, displacement, velocity, and/or acceleration so as to detect rapid, direction changing movement of the input device such as a shaking or jiggling up and down or side to side or angular motion or other seemingly erratic patterned movement of the input device; and initiating a preconfigured application in response to detection of said shaking motion. In an embodiment of the disclosure, the input device is a mouse, and the method is performed without actuating a button on the mouse. The preconfigured application may be a search function, and in particular may be a Web search invoked when a shaking action is detected while the user is viewing a Web site. This shaking function, unlike the shaking of a mouse to bring a computer out of a screen saver or suspend state, actually invokes or instantiates a software operation or function, with little effort on the part of a user.

In accordance with the disclosure, a mouse shake or jiggle may be used for immediately accessing a Web search, such as a Yahoo!® Web search, from any personal computing device or terminal with a pointing device, or for invoking software commands or functions in programs a user is interacting with.

BRIEF DESCRIPTION OF THE DRAWINGS

FIGS. 6A-6C illustrate coding of initialization, mouse movement, and timeout events, respectively, in the algorithm of FIG. 5.

DETAILED DESCRIPTION OF PREFERRED EMBODIMENTS

Figure 1A:
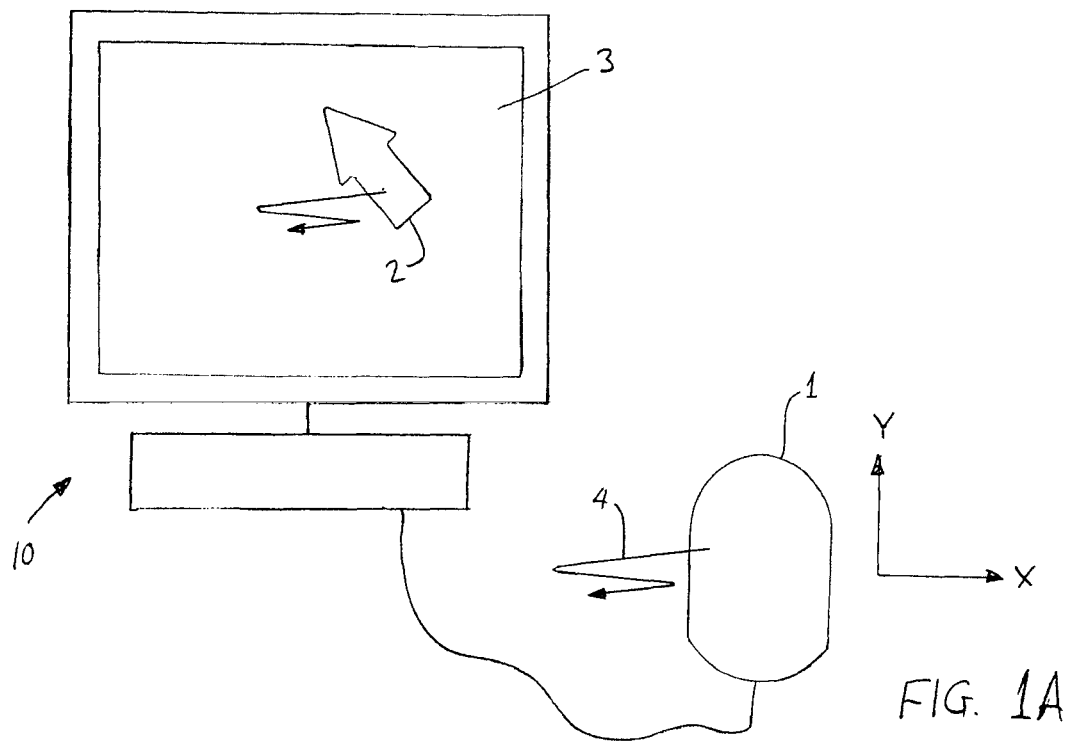
FIG. 1A illustrates a mouse shake or "jiggle" action performed in accordance with an embodiment of the disclosure.
Figure 1B:
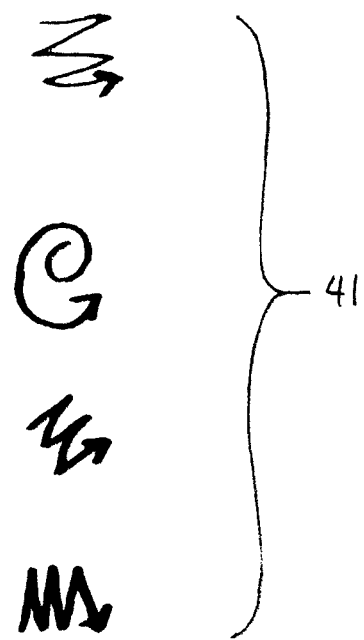
FIG. 1B schematically illustrates a variety of motion patterns that may be interpreted as a "jiggle" in accordance with the disclosure.

In a specific embodiment of the disclosure, a personal computer 10 is provided with an input device, in this embodiment mouse 1, controlling a pointer or cursor 2 on a display screen 3 (see FIG. 1A). A user of the computer rapidly moves the mouse in changing directions, that is the user shakes ("jiggles") the mouse to invoke a preconfigured application. In general, motion of the mouse may be sideways (x-direction) or forward/reverse (y-direction), as shown in FIG. 1A. The rapid, multi-directional motion (shaking motion or "jiggle") is not limited to the sideways zigzag motion 4 shown. As shown schematically in FIG. 1B, the motion may follow any of a variety of paths 41: horizontal, vertical or diagonal zigzag paths, curved paths, or a combination thereof. Software-enabled algorithms for detecting a mouse movement and interpreting that movement as a "jiggle" may run constantly without interfering with normal mouse usage; accordingly, they do not need to be enabled using a mode switch, as is generally the case with conventional mouse gesture recognition software. Examples of detection algorithms which may be used in embodiments of the invention are discussed in more detail below.

Application Activation

In one embodiment, the preconfigured application is a "Search" function. A default assignment of a mouse shake to a standard "Search" action (a search of either the Web or a local file system) gives the mouse shake a specific utility and value for a large number of users, similar to the utility of the widely-known context menu associated with the right-click on a typical mouse. Alternatively, the action invoked by the mouse shake 4 may be user configurable or application designer configurable, as are most mouse gestures.

Figure 2:
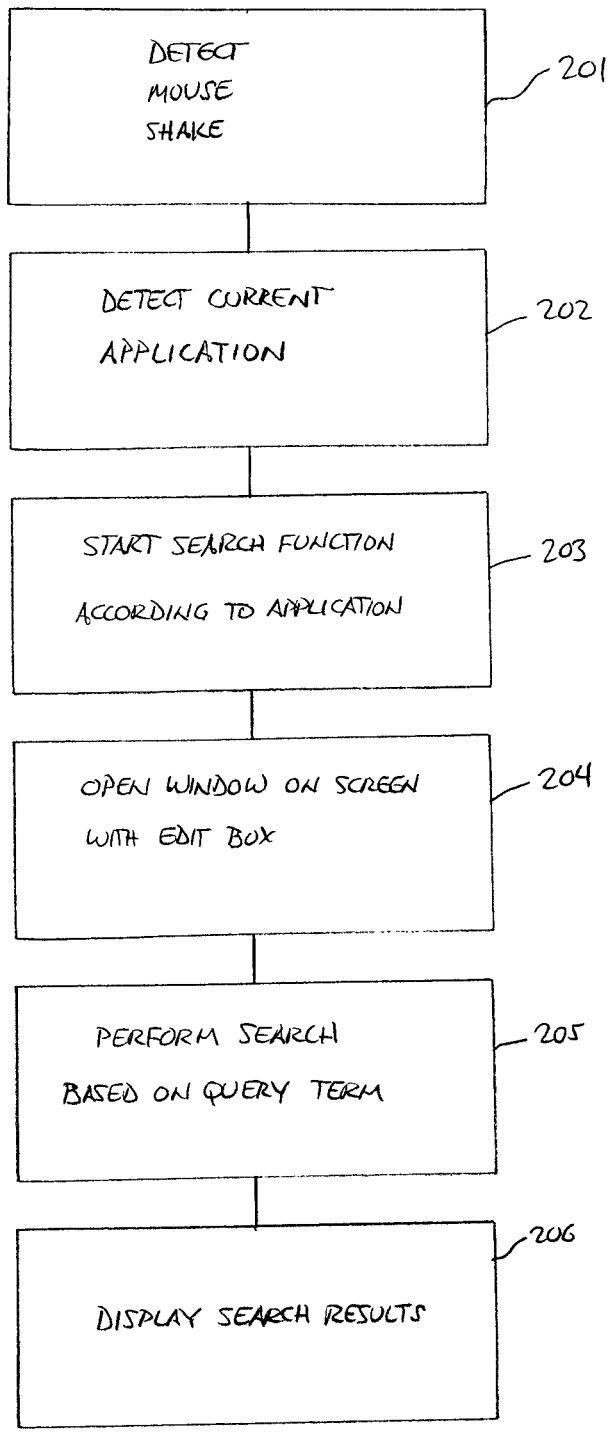
FIG. 2 is a flowchart of steps in a software-enabled procedure for activating a "Search" function, in accordance with an embodiment of the disclosure.

Software interpreting and supporting a mouse shake may be configured, by way of non-limiting example, as a local system- or application- or browser-plugin or separate application that performs a method as diagrammed in the flowchart of FIG. 2. The software detects whenever the user shakes the mouse from any application running on the system, e.g. from the desktop, from a webpage, editing a document, or reading an email (step 201). Motion of the mouse 1 is evaluated with respect to one or more criteria such as acceleration, velocity, total travel distance, directions traveled over a short time span, displacement or the like to distinguish a rapid up-and-down or side-to-side or other multi-directional shake or "jiggle" from more typical mouse movements encountered during application usage. According to one algorithm, for example, directional changes in the mouse are detected; if such directional changes are within prescribed boundaries over a predetermined time period, the mouse movement is deemed to be a "jiggle." According to another algorithm, a display screen of the computer is mapped onto a grid, and movement of the mouse between cells of the grid over a predetermined time period with a certain pattern of movement is deemed to be a "jiggle."

The system then detects the application currently in use (step 202), to determine the predetermined type of action to be invoked. For example, in one embodiment, if the application in use is a Web browser, shaking the mouse will invoke a Web search utility whereupon a search query text entry box will appear. In another embodiment, if a word processing application is in use, shaking the mouse can invoke a dictionary lookup or spell check; if another offline application is currently being interacted with, shaking the mouse can invoke a local file search. In still another embodiment, if a word processing application is in use, shaking the mouse can invoke saving the document in a preselected or default folder.

Figure 3:
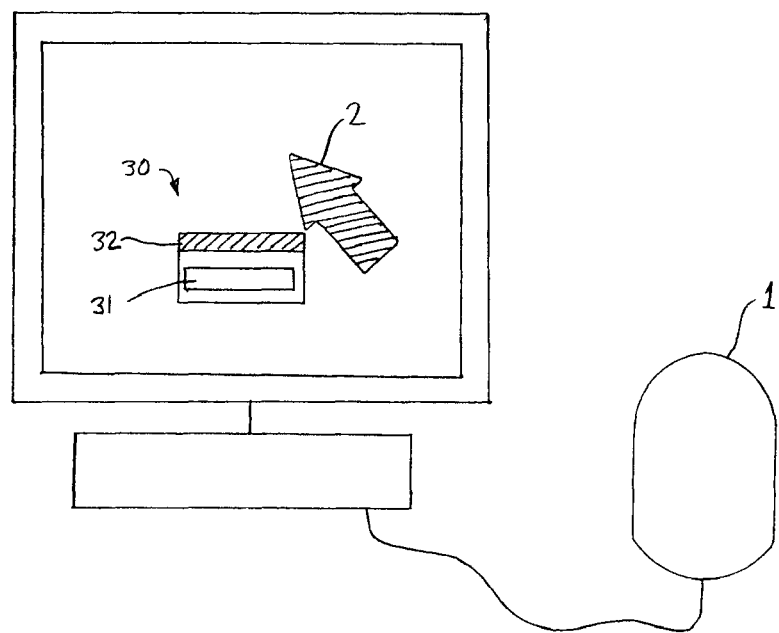
FIG. 3 illustrates opening of a search query window in response to a mouse shake, in accordance with an embodiment of the disclosure.

The appropriate Search function (or other predetermined function) is then started (step 203), and a window is opened on the display screen to accept the user's search query (step 204). As shown in FIG. 3, the new window 30, including a text edit box 31 for the search query, may be located next to the pointer 2, and may display the logo of the search function provider (e.g. Yahoo!®) in a portion 32 thereof. The search query term is then communicated to a search service provider, in one embodiment the provider of the zero-click activation application, so that the search can be performed in accordance with the query typed by the user in box 31 (step 205), and the results displayed on the screen (step 206).

The action taken in response to the mouse shake may be programmed via a remote connection to a server. It will be appreciated that multiple actions may be taken in response to the mouse shake (e.g. audio feedback, visual effects displayed on the desktop, a change in the appearance of the cursor, etc.). In one embodiment, as shown in FIG. 3, the pointer 2 is displayed in a different color to alert the user that edit box 31 has been opened and is waiting for input.

Figure 4:
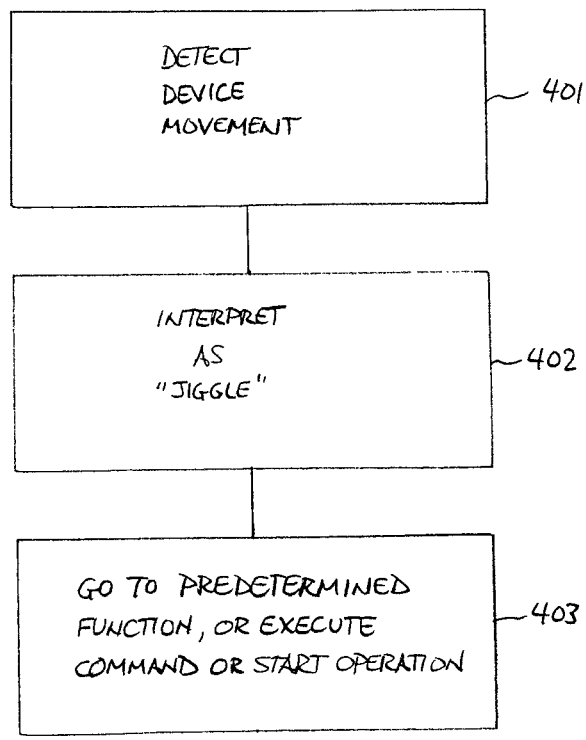
FIG. 4 is a flowchart of steps in a software-enabled procedure for activating a predetermined function in response to a shake or "jiggle" movement of an input device.

More generally, a shaking motion of the mouse may be used to invoke any desired function from any application. Still more generally (as shown in the flowchart of FIG. 4), any user input device involving physical movement (mouse, trackball, stylus, etc.) may be shaken or "jiggled," and that motion may be interpreted as an instruction to go to a predetermined function. The movement of the device is detected (step 401), and that movement is evaluated and interpreted as a "jiggle" (step 402), as opposed to a normal input or pointing function. In response to such detection, control is transferred to a predetermined function (step 403). As noted above, the predetermined function may depend upon the application being interacted with at the time the shake or "jiggle" is performed.

Detecting and Interpreting Shaking Motion

As noted above, detecting a shake or "jiggle" involves recording movements of the input device, and evaluating those movements in accordance with an algorithm that applies specific criteria. In the following descriptions of detection algorithms, it will be assumed that the device is a mouse, and that movement of the mouse is captured by the operating system (e.g. by application programming interface "LowLevelMouseHook" in a Microsoft® Win32 operating system) regardless of which application is presently running.

(1) Detection of a Mouse Shake: Directional Changes

Software implementing an exemplary algorithm analyzes the mouse movement data to detect changes in the direction of movement. A mouse shake or "jiggle" is detected when a prescribed number of directional changes that are within prescribed boundaries is recorded within a specific period of time (the Timeout period).

Figure 5:
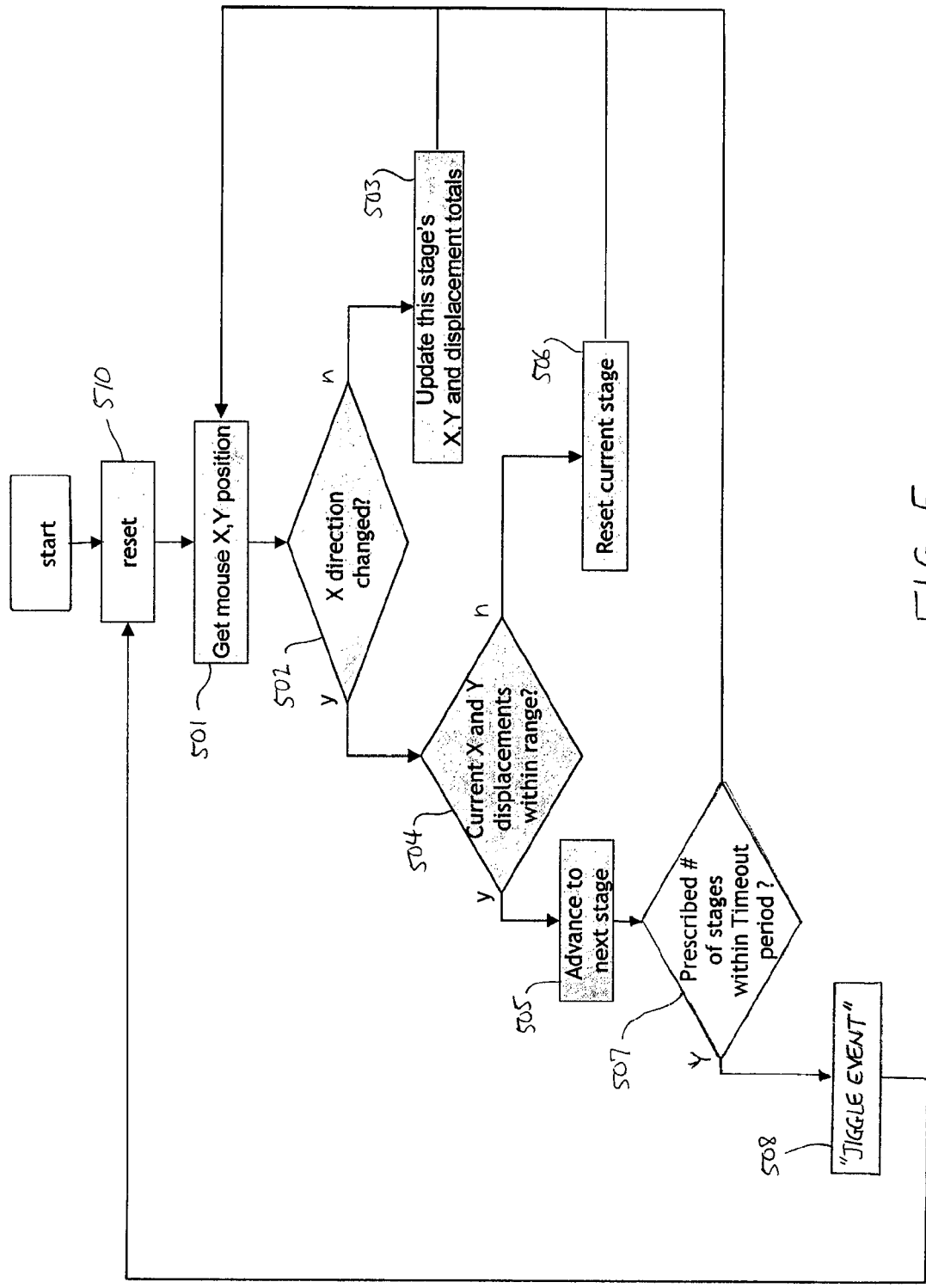
FIG. 5 is a flowchart of steps in a first algorithm for interpreting a mouse movement as a "jiggle" in accordance with an embodiment of the disclosure.

A schematic flowchart for this algorithm is shown in FIG. 5. On initialization (step 510), the software sets the current direction to "Positive" and reads the current mouse x-y position (step 501). When the software receives a signal that the mouse has moved (a "mouse move event"), it compares the current x-y position of the mouse against the previously received position value. This comparison is used to determine whether a directional change has occurred (step 502). If the current direction is "Positive," and if the x value is less than in the previous measurement, then a change in direction to "Negative" has occurred. If the current direction is "Negative," and if the x value is greater than in the previous measurement, then a change in direction to "Positive" has occurred. In this algorithm, each period of time between direction changes is called a "stage." The software also keeps a running total of the x and y displacements for each stage being currently measured (step 503).

When a directional change is detected, the x and y displacements are evaluated and compared with configurable minimum and maximum values. If the current displacement is greater than the minimum value and less than the maximum value (step 504), the stage is completed (step 505). If the displacement is out of range, the stage is discounted (step 506).

If the prescribed number of directional changes have occurred and successfully completed their stages within the movement Timeout period (step 507), a "jiggle event" is deemed to have occurred (step 508). If the time to complete the stage exceeds the movement timeout value, the entire algorithm resets, so that all stages and displacements are set to zero.

In one embodiment a user may choose a sensitivity level for the algorithm—that is, the number of directional changes in the mouse movement required to conclude that a "jiggle event" has occurred. In an embodiment, the default value is 5 directional changes, but a user may set the number to 3. In an embodiment, the minimum displacement of the mouse is 10 pixels, the maximum displacement is 200 pixels and the Timeout period is 500 msec.

FIG. 6A illustrates a block of pseudocode 601 for implementing initialization or reset (step 510 in FIG. 5) in the above-described algorithm. FIG. 6B illustrates a block of pseudocode 602 for detecting an evaluating a change in direction and the total x and y displacements, and for signaling a "jiggle event," in accordance with this algorithm. FIG. 6C illustrates a block of pseudocode 603 for a timeout event, in which displacements are set to zero and the timer is restarted.

(2) Detection of Mouse Shake: Movement Between Grid Cells

According to an exemplary detection algorithm, movement of the mouse between cells of a grid comprising pixels of a display device is detected over a prescribed period of time, and a "jiggle event" is deemed to have occurred if the mouse movement fits a prescribed pattern.

Figure 7A:
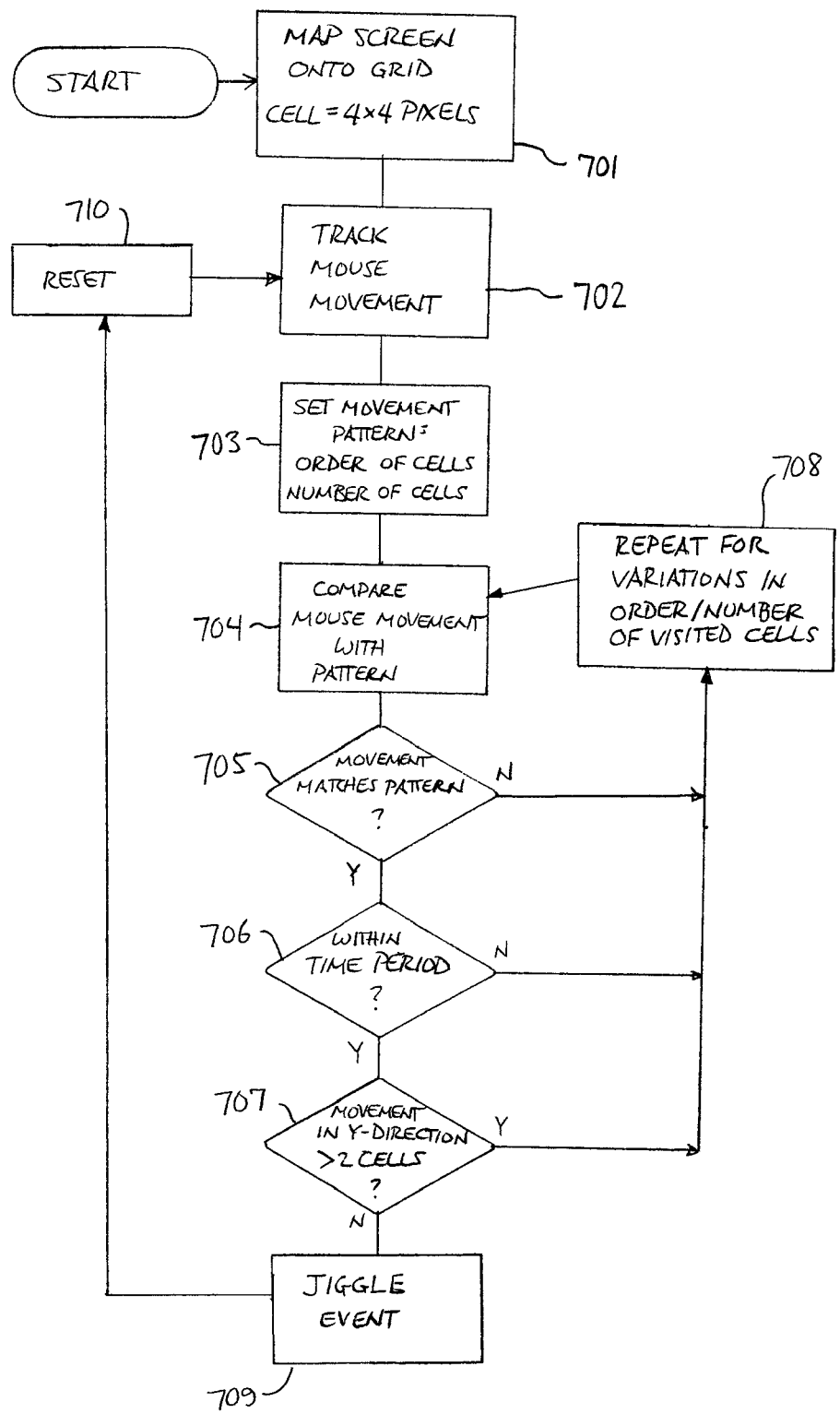
FIG. 7A is a flowchart of steps in a second algorithm for interpreting a mouse movement as a "jiggle" in accordance with another embodiment of the disclosure.
Figure 7B:
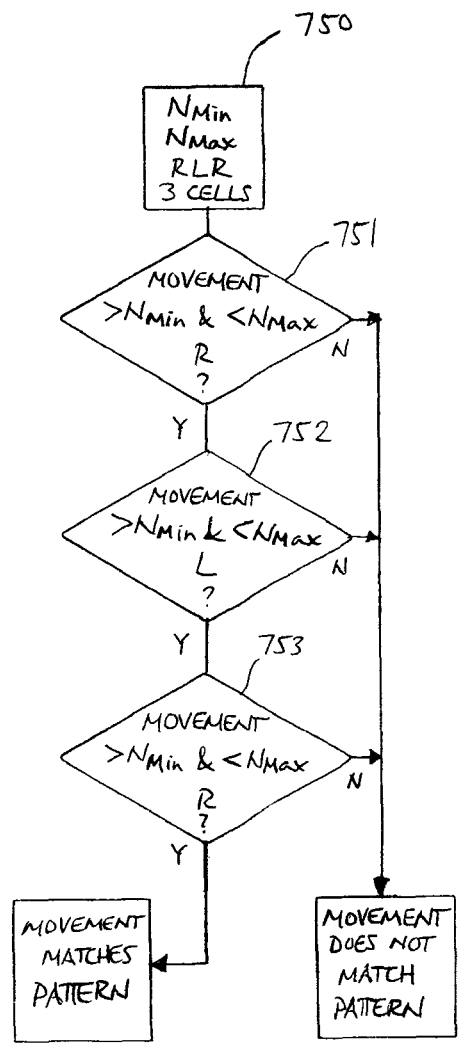
FIG. 7B is a flowchart giving details of a comparison step shown in FIG. 7A.

A schematic flowchart for this algorithm is shown in FIG. 7A. The display screen is mapped (step 701) onto a grid made up of cells of a convenient size for tracking the mouse movement (as viewed by corresponding movement of a cursor or pointer on the display); for example, the cells may be square and 4×4 pixels in size. The mouse movement is then tracked (step 702) to determine which cells have been visited in the current movement. In step 704, the mouse movement is compared with a movement pattern characterized (step 703) by a number of cells and the order in which the cells are visited. In a particular example of such comparison, shown in the flowchart of FIG. 7B, the prescribed movement pattern 750 involves 3 cells in a right-left-right sequence. The software determines (steps 751-753) whether the mouse has moved from a starting cell at least a minimum number $N_{Min}$, but less than a maximum number $N_{Max}$, of cells to the right; followed by movement of at least $N_{Min}$ but fewer than $N_{Max}$ cells to the left; and then movement of at least $N_{Min}$ but fewer than $N_{Max}$ cells to the right.

If the mouse has been moved according to the pattern (step 705), the software also evaluates (step 706) whether the movement has occurred within a predetermined configurable time period (e.g. 500 msec). A shaking or "jiggle" motion of the mouse is assumed to be a side-to-side movement (that is, in the x-direction); any movement including a change of position in the y-direction of more than two cells is ignored (step 707).

The above-described steps 704-707 are repeated for other variations in the order of visited cells (e.g. left-right-left instead of right-left-right), and in the number of visited cells (step 708); the mouse movement is re-evaluated in comparison with a revised movement pattern. If all the criteria are met, a "jiggle event" is judged to have occurred (step 709), and the mouse tracking and timer are reset (step 710).

Software Implementation

The software for the above-described zero-click activation process may also be built in any way now known or to become known, and, by way of non-limiting example, may be implemented as a browser extension, plug-in or into a browser script library, so as to only take effect during browsing of Web sites, or only certain Web sites, or to work on systems that do not have security permissions to install a local plugin. This approach may help raise awareness of the zero-click activation feature. For example, an animated banner advertisement may prompt the user to shake the mouse; when the user does so, the browser detects the shake, opens a search window, and shows an option to download the feature to the client.

The zero-click activation of an application described above allows for a simple, immediate action to initiate a Web search or other predetermined software operation or function. Using the shaking action avoids the problem of training the user to articulate a specific mouse gesture or button sequence. For example, shaking the mouse is much easier to remember that "right button down, move right, move down, move left, right button up". Furthermore, shaking a pointing device (such as a mouse) is not a typical pointing action and is likely to not be misinterpreted as a normal usage of the pointing device (mouse, trackball, stylus, etc.). Accordingly, a preactivation command (e.g. a right-click) is not necessary to first enable recognition or interpretation of the device movement.

The shaking action as described herein requires no button click or specific level of manual dexterity, so that (unlike mouse gestures) it is appropriate for all level of user expertise and all age levels. It removes the need to carefully articulate the pointer over a small button, icon or UI widget, and is thus easier for a novice user to discover and activate.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A method comprising:
receiving, by a computing device comprising an input device and a display, a sensitivity level to determine that a jiggle motion has occurred compared with other motions, the jiggle motion associated with a random movement;
detecting, by the computing device, during interaction with a software application executing on the computing device, the jiggle motion of the input device detectable by detection software operating on the computing device;
detecting, by the computing device, the software application in use to determine a software operation to perform associated with the jiggle motion;
analyzing, by the computing device, the jiggle motion of the input device to determine if the motion of the input device meets predetermined motion criteria;
initiating, by the computing device, if the predetermined motion criteria are met, the software operation associated with the jiggle motion; and
not initiating the software operation if the predetermined motion criteria are not met.

2. The method according to claim 1, wherein the detection software is in communication with the software application.

3. The method according to claim 1, wherein the software application comprises the detection software.

4. The method according to claim 1, wherein the software operation associated with the jiggle motion occurs within the software application.

5. The method according to claim 1, wherein the software operation associated with the jiggle motion is performed within a second software application.

6. The method according to claim 5, wherein the second software application is in communication with the detection software.

7. The method according to claim 1, wherein said software operation is a search function.

8. The method according to claim 1, wherein said software operation is a save function.

9. A method according to claim 8, wherein the save function is effective to save a document from a word-processing application to a preselected location.

10. A non-transitory computer readable storage medium comprising executable instructions tangibly stored thereon for performing a method, the method including the steps of:
- receiving, by a computing device comprising an input device and a display, a sensitivity level to determine that a jiggle motion has occurred compared with other motions, the jiggle motion associated with a random movement;
- detecting, by the computing device, during interaction with a software application executing on the computing device, the jiggle motion of the input device detectable by detection software operating on the computing device;
- detecting, by the computing device, the software application in use to determine a software operation to perform associated with the jiggle motion;
- analyzing, by the computing device, the jiggle motion of the input device to determine if the motion of the input device meets predetermined motion criteria;
- initiating, by the computing device, if the predetermined motion criteria are met, the software operation associated with the jiggle motion; and
- not initiating the software operation if the predetermined motion criteria are not met.

11. The non-transitory computer readable storage medium according to claim 10, wherein the detection software is in communication with the software application.

12. The non-transitory computer readable storage medium according to claim 10, wherein the software application comprises the detection software.

13. The non-transitory computer readable storage medium according to claim 10, wherein the software operation associated with the jiggle motion occurs within the software application.

14. The non-transitory computer readable storage medium according to claim 10, wherein the software operation associated with the jiggle motion is performed within a second software application.

15. The non-transitory computer readable storage medium according to claim 14, wherein the second software application is in communication with the detection software.

16. The non-transitory computer readable storage medium according to claim 10, wherein said software operation is a search function.

17. The non-transitory computer readable storage medium according to claim 10, wherein said software operation is a save function.

18. The non-transitory computer readable storage medium according to claim 17, wherein the save function is effective to save a document from a word-processing application to a preselected location.

19. A computing device comprising an input device and a display, the computing device comprising:
- a data storage; and
- a processor for executing instructions stored on the data storage, the instructions comprising:
- receiving, by processor, a sensitivity level to determine that a jiggle motion has occurred compared with other motions, the jiggle motion associated with a random movement;
- detecting, by the processor, during interaction with a software application executing on the computing device, the jiggle motion of the input device detectable by detection software operating on the computing device;
- detecting, by the processor, the software application in use to determine a software operation to perform associated with the jiggle motion;
- analyzing, by the processor, the jiggle motion of the input device to determine if the motion of the input device meets predetermined motion criteria;
- initiating, by the processor, if the predetermined motion criteria are met, the software operation associated with the jiggle motion; and
- not initiating the software operation if the predetermined motion criteria are not met.

20. The computing device according to claim 19, wherein the detection software is in communication with the software application.

* * * * *